(12) United States Patent
Palin

(10) Patent No.: US 7,577,087 B2
(45) Date of Patent: Aug. 18, 2009

(54) FASTER FINE TIMING OPERATION IN MULTI-CARRIER SYSTEM

(75) Inventor: Arto Palin, Viiala (FI)

(73) Assignee: Nokia Corporation, Espoo (FI)

( * ) Notice: Subject to any disclaimer, the term of this patent is extended or adjusted under 35 U.S.C. 154(b) by 507 days.

(21) Appl. No.: 10/563,085

(22) PCT Filed: Jun. 30, 2003

(86) PCT No.: PCT/FI03/00529

§ 371 (c)(1),
(2), (4) Date: Jun. 5, 2006

(87) PCT Pub. No.: WO2005/002164

PCT Pub. Date: Jan. 6, 2005

(65) Prior Publication Data

US 2007/0053473 A1 Mar. 8, 2007

(51) Int. Cl.
*H04J 11/00* (2006.01)

(52) U.S. Cl. .................... 370/210; 370/206

(58) Field of Classification Search ........... 370/206, 370/207, 208, 210, 203, 204, 205, 252
See application file for complete search history.

(56) References Cited

U.S. PATENT DOCUMENTS

| 5,848,107 A | 12/1998 | Philips |
| 7,050,511 B2* | 5/2006 | Jeong et al. ............... 375/301 |
| 7,075,949 B2* | 7/2006 | Okada et al. ............... 370/510 |
| 7,177,376 B2* | 2/2007 | Atungsiri et al. ........... 375/343 |
| 7,388,922 B2* | 6/2008 | Yamagata .................. 375/260 |
| 2002/0017948 A1* | 2/2002 | Hyakudai et al. .......... 329/304 |
| 2002/0110202 A1* | 8/2002 | Wilson et al. .............. 375/340 |
| 2002/0126220 A1* | 9/2002 | Wilson et al. .............. 348/518 |
| 2003/0016773 A1* | 1/2003 | Atungsiri et al. ........... 375/355 |
| 2003/0218973 A1* | 11/2003 | Oprea et al. ............... 370/210 |
| 2006/0233269 A1* | 10/2006 | Bhushan et al. ............ 375/260 |
| 2007/0086329 A1* | 4/2007 | Glazko et al. .............. 370/208 |
| 2008/0239941 A1* | 10/2008 | Gold-Gavriely et al. .... 370/210 |
| 2008/0298228 A1* | 12/2008 | Chung et al. ............... 370/210 |

FOREIGN PATENT DOCUMENTS

| EP | 0 837 582 A2 | 4/1998 |
| EP | 0 955 754 A1 | 11/1999 |
| WO | WO 99/17493 A1 | 4/1999 |
| WO | WO 01/69878 A1 | 9/2001 |

OTHER PUBLICATIONS

PCT International Search Report (as published), International Application No. PCT/FI2003/000529, Date of Completion of Search—Jan. 13, 2004.

* cited by examiner

*Primary Examiner*—Chi H. Pham
*Assistant Examiner*—Kevin Mew
(74) *Attorney, Agent, or Firm*—Locke Lord Bissell & Liddell LLP

(57) ABSTRACT

There is provided a method, system and receiver for receiving data over a communication link. An energy of said signal in respect of an estimated guard interval position of said signal is defined. Based on said energy, a position for a time domain to a FFT window is selected. Trial positions can be formed in accordance with a predetermined schemes. The selected position can be selected from the trial positions in such a way that smallest amount of inter symbol interference is formed.

25 Claims, 11 Drawing Sheets

FASTER FINE TIMING OPERATION IN MULTI-CARRIER SYSTEM

TECHNICAL FIELD OF THE INVENTION

The invention relates to method, system and receiver for receiving data over a communication link.

BACKGROUND OF THE INVENTION

Latest environments and situations in broadcasting, which in itself has a long history in television and radio even as a digitalised one, have clearly created a need for evaluating the broadcast technology in a situation where it was not originally designed. For example, digital broadcast system such as DVB system has been evaluated in situations for which it was not originally designed, like mobile reception. Moreover perhaps in some other fields also, Orthogonal Frequency Division Multiplex (OFDM) radio technique, which is used for example in DVB-T, is similarly facing the risen mobility challenge.

Also some new usage applications for broadcasting technology, for example like IP-Data Casting (IPDC), have different usage scenarios and, hence, different requirements and challenges.

These have for their part created further requirements such as power consumption considerations. One solution for this has been so-called time slicing technology. In the examples of the broadcasting or OFDM having some power consumption considerations, for example portable IPDC like usage, the start-up time should be very fast because of the power saving aspects such as transmission and reception based on bursts. The time slicing is used to save power, and the synchronization into bursts have to be fast.

Current approaches utilises coarse symbol timing, which is based on guard interval correlation. An example of the guard interval correlation is shown in FIG. 1, where Nu denotes a symbol (or sometimes referred to as useful symbol interval), preferably used in OFDM signal. One OFDM symbol can contain N samples. Ng denotes guard interval part length. The current solutions uses also fine timing (FT), which is based on estimating the position of Channel Impulse Response (CIR). However, the coarse timing accuracy is not good enough so that the FT can always find the best possible Fast Fourier Transform (FFT) window placement.

As one approach so-called fallback procedure is used to cope with the inaccuracy of the coarse timing. A basic assumption is that coarse timing is detecting the first peak of the CIR (i.e. the beginning of the guard interval). However, for example the strong pre-echoes mixes this assumption, and the FFT-window placement is erroneous. The FT can handle the errors up to $\frac{1}{2}*(\frac{1}{3}*Nu-Ng)$, where similarly Nu is symbol part length and Ng is guard interval part length. In samples, the accuracy is as shown in Table 1.

TABLE 1

Required coarse timing accuracy in samples.
Maximum errors with different modes
(guard interval size in brackets)

| Guard interval | 2k | 4k | 8k |
|---|---|---|---|
| 1/32 | 309 (64) | 618 (128) | 1237 (256) |
| 1/16 | 277 (128) | 554 (256) | 1109 (512) |
| 1/8 | 216 (256) | 426 (512) | 853 (1024) |
| 1/4 | 85 (512) | 170 (1024) | 841 (2048) |

Unfortunately, the required accuracy is higher the longer the guard interval is. Because of this perhaps, some further adjustment is needed, with two longest guard intervals. This fallback procedure is detecting the time synchronization failure by using Forward Error Correction (FEC) (BER/RS-lock) failure detection. Therefore, if the coarse timing, Transmission Parameter Signalling (TPS) and frequency are in lock and FEC fails, the Signal to Noise Ratio (SNR) is too low or fine timing acquisition has failed. To find out is the problem with the fine synchronization, pre-FFT position of the guard interval has to be shifted towards past, and new acquisition has to be started. The amount of shift depend perhaps how much error can be accepted. The recommended value can be $1.7\times\frac{1}{2}*(\frac{1}{3}*Nu-Ng)$. This would require four fall back loops until the range of guard interval has been tried (the very worst case could be that the coarse timing is detecting the last peak of the channel impulse response). This is illustrated in the example of FIG. 2. FT-window (200) according to the coarse timing is shown in FIG. 2. Four trial positions (201) are also depicted. The uppermost can be seen the first trial position. The next trial position is shown below the first, and in the example the trial position is moved to the left. Also a search window (202) is depicted, which size equals to the guard interval length.

Because the fine timing (FT) is using time interpolated scattered pilots, four fallback loops require quite much time. With the current 8-tap time interpolation this will be 4×32 symbols, and the required time with different modes of operation of DVB-T transmission will be:

8 k: ~140 ms (4-tap 70 ms)

4 k: ~70 ms (4-tap 35 ms)

2 k: ~35 ms (4-tap 18 ms)

One proposed improvement is to use linear (i.e. 2-tap) time interpolation during acquisition phase. With the linear interpolation, 4×4 symbols is required which will be 8 k: ~20 ms 4 k: ~10 ms 2 k: ~5 ms However, when using the linear interpolation in acquisition, yet some problems rises.

For example, the FEC failure detection may be unreliable because of insufficient time interpolation. In the presence of perhaps high Doppler, FEC failure may happen, although the FFT-window position may be correct. This will cause fine synchronization to try all the trial position, and because FEC failure is always there, the conclusion will be that the signal is too weak although with 8-tap/4-tap interpolation FEC failure wouldn't happen.

For another example, the 2-tap (i.e. linear) interpolation may cause so-called ghost peaks into the channel's impulse response. The ghost peaks (i.e. 302), shown in the example of FIG. 3, are perhaps caused by the high Doppler and insufficient time interpolation (time interpolated pilots will not match into frequency). These ghost peaks will obscure the search of guard interval position, as illustrated in the example with 4 k system in FIG. 3. A diagram (300) depicts IFFT with 4-tap time interpolation. The interference caused by the ghost peak (real peak/ghost peak) is 30 dB in the diagram (300). A diagram (301) depicts IFFT with 2-tap time interpolation. The interference caused by the ghost peak (Real peak/Ghost peak) can be 17 dB in the diagram (301). In the example of FIG. 3, Inverse FFF (IFFT) with 4 k mode and Doppler 120 Hz is applied.

In view of various limitation of broadcasting systems or multi-carrier radio technique, it would be desirable to avoid or mitigate these and other problems associated with prior art. Thus, there is a need for a faster symbol-timing operation in multi-carrier systems.

SUMMARY OF THE INVENTION

Now a method, a system and a receiver arrangement have been invented to speed up and simplify a symbol-timing operation in multi-carrier systems.

In accordance with aspects of the invention, there is provided a method, a system, a computer readable medium comprising program code and a receiver for receiving a multi-carrier signal, comprising:

an energy of said signal in respect of an estimated guard interval position of said signal is defined, and based on said energy, a position for a time domain to a frequency domain transform window is selected.

In various embodiments, predetermined amount of trial positions for (Fast Fourier Transform) FFT-window can perhaps be defined according to a predefined scheme. The energy is perhaps defined for each trial period in respect of the estimated guard interval position. The position of the trial position can perhaps be selected for the FFT-window so that the smallest amount of interference is formed for a desired signal.

In some embodiments the energy estimation is applied, wherein the energy inside and/or outside the estimated guard interval position is defined. A certain fine timing (FT) block, sometimes used for the long echo estimation purpose, may perhaps be applied for various embodiments with some quite minor modifications. An exemplary theoretical basic idea may perhaps be that energy outside the guard interval is smallest with the position of Fast Fourier Transform (FFT), which is forming smallest amount of Inter Symbol Interference (ISI).

Preferably, in various embodiments, the fallback procedure in the receiving process or in the receiver will be speeded up. Various embodiments of the invention may require relatively small economical efforts to implement. The implementation into some existing chips is relatively simple because the fine timing (FT) operation may to some extent already calculate the energy inside and outside the estimated guard interval position. Although this is calculated for the long echo estimation purpose, with adaptation it can be beneficially used for estimating the energy in relation to the estimated guard interval. For example, in various embodiments the control according to estimated value can be adapted in such a way. Furthermore in various embodiments, the maximum time for fine timing (FT) is always the same, which will help in, for example, IP Data Cast (IPDC) technique.

Advantageously, various embodiments enable to use linear time interpolation, which is much faster than 8-tap time interpolation. The correct fall back position can be selected without FEC detection, which means also some savings in the critical time. Furthermore, because FEC detection is unreliable with short time interpolation and dynamic channel, with various embodiments these fallbacks can be avoided as well. Also the timing is fixed, which means that various embodiments always use the same amount of time; whereas with the known methods, the timing is based on channel characteristics and, hence, only the maximum time (which is long) is known for sure.

For better understanding of the present invention, together with other and further objects thereof, reference is made to the following description, taken in conjunction with the accompanying drawings, and its scope will be pointed in the appending claims.

BRIEF DESCRIPTION OF THE DRAWINGS

The invention will now be described, by way of example only, with reference to the accompanying drawings, in which.

DETAILED DESCRIPTION OF THE EMBODIMENTS

Figure 1:
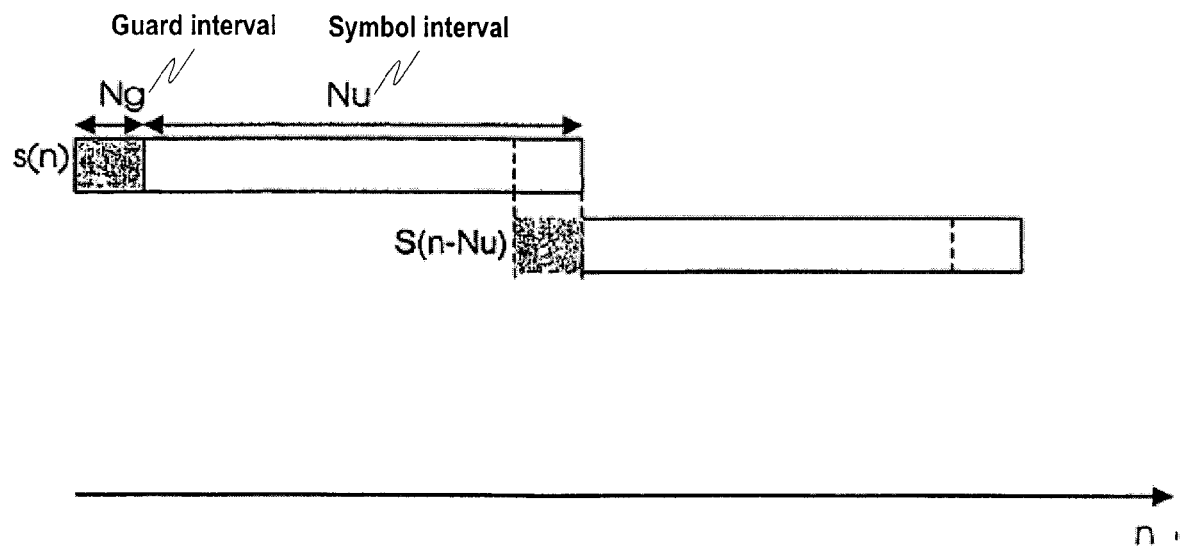
FIG. 1 depicts an example of a basic timing/position regarding known correlation method.
Figure 2:
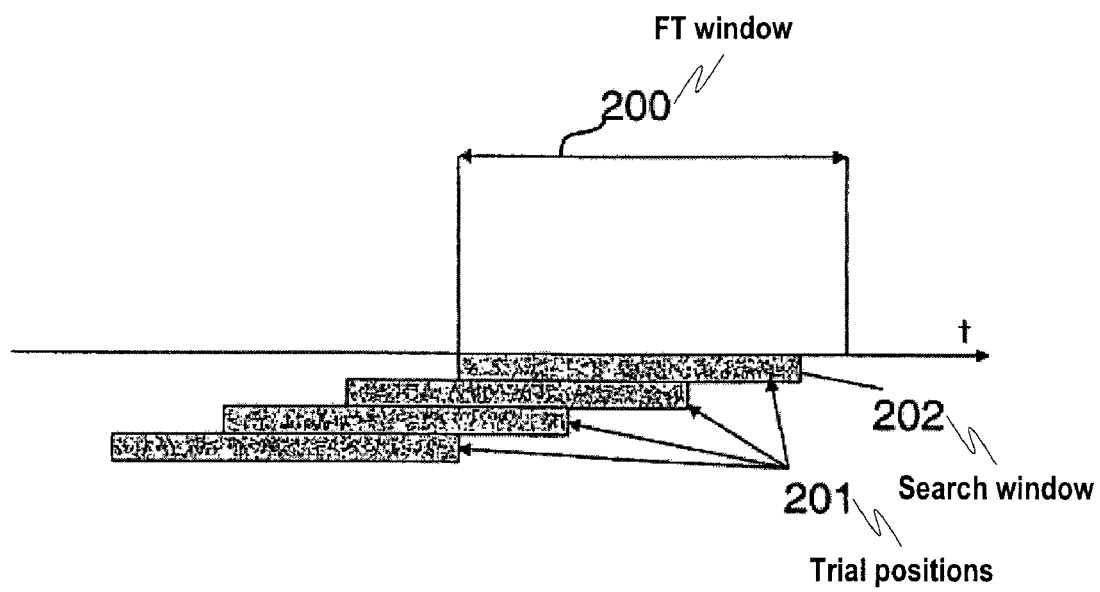
FIG. 2 depicts an example of Fine Timing (FT) operation in fall back procedure.
Figure 3:
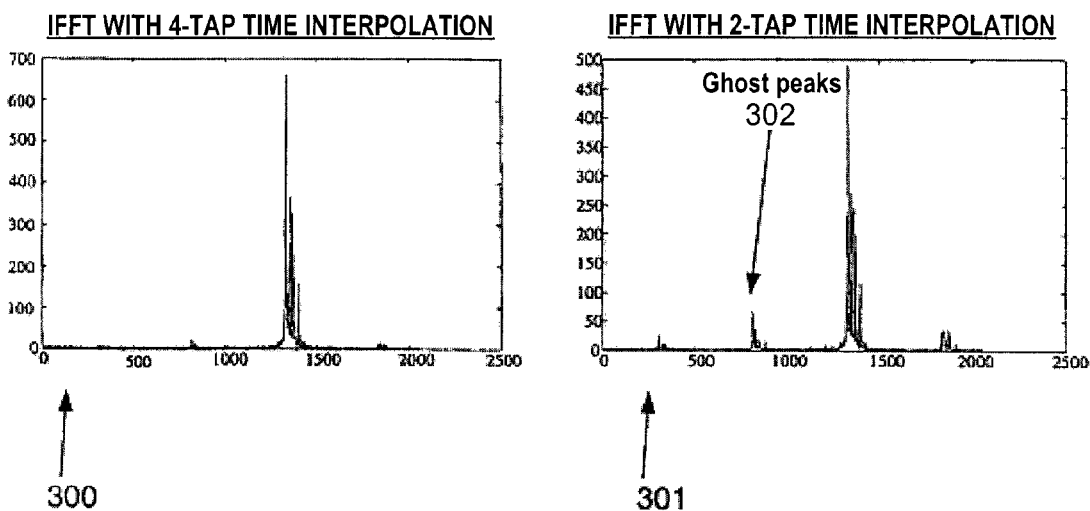
FIG. 3 shows examples of the disadvantageous ghost peaks.

Thus the following description of the various embodiments, reference is made to the accompanying drawings which form a part hereof, and in which are shown by way of illustration various embodiments in which the invention may be practiced. It is to be understood that other embodiments may be utilized and structural and functional modifications may be made without departing from the scope of the present invention.

Some embodiments of the invention apply a method for receiving a multi-carrier signal such as OFDM signal. Preferably, the OFDM signal can be applied in DVB system. In some cases the OFDM is used in mobile DVB or in IP over mobile DVB-T environment. Perhaps the mobile IP over DVB is sometimes referred to as DVB-X technology also. The multi-carrier signal is received at the receiver. Because of the power saving aspects, time slicing or the like is applied in the system for saving a power of the receiver, which preferably is a mobile one. In the time slicing the transmission for services takes basically place in form of burst. Correspondingly receiver can receive and adapt to certain services related to certain bursts. The synchronization into bursts should perhaps be fast or fast enough.

Some embodiments of the invention apply the guard interval. In the following some theoretical details on the appliance of the guard interval for various embodiments are described. In order to increase the immunity of an OFDM system to a multi-path, a guard interval is perhaps added to the transmitted symbols. This guard interval extends the length of the transmitted symbol. Sometimes the window length used in the demodulator to decode the symbol can be that of the active symbol length and this excludes the guard interval period. If there are multiple reflections in the propagation path, so that there is more than one path between the transmitter and the receiver, and these paths differ in length then the same numbered symbol perhaps arrive at the receiver at slightly different times. Symbols arriving later than the first arrived symbol, due to reflection paths of differing lengths, but which perhaps arrive no later than the guard interval period may still be seen as having the same value within the demodulator window. The result can be that the later arriving symbols, provided they are not delayed longer than the guard interval, will add constructively to the received energy, whereas symbols which are delayed longer than the guard interval will have a destructive effect. The degree of the destructive effect can increase, e.g. proportionately with the amount by which the delay in arrival time of the additional reflected symbols exceeds the guard interval.

In various embodiments, when processing the signal in the terminal when the initial FFT in the reception is perhaps performed the following can take place. For example, when processing the estimated position of the guard interval based on perhaps the CIR, and when processing the energy outside/inside the guard interval. So some cases may not immediately relate to the signal before the initial FFT perhaps. Preferably, the energy in respect of the estimated guard interval position changes accordingly. Advantageously in various embodiments, the position which has the smallest amount of the inter symbol interference can be discovered based on the detected energy position samples. For example, the energy outside of the estimated guard interval is smallest with the position of the FFT, which is forming the smallest amount of the ISI. For another example, the maximum energy inside estimated guard interval can inversely indicate the position of the FFT, which is forming the smallest amount of the ISI. For another example, the energy ratio between the energy inside estimated guard interval and outside estimated guard interval can indicate the appropriate FFT position. For another example, the guard interval is positioned in such a way that the energy of the CIR inside the guard interval is maximised. In the positioning of the trial position, a FFT-window position is searched and perhaps selected, where energy outside the estimated guard interval is minimized.

Figure 4:
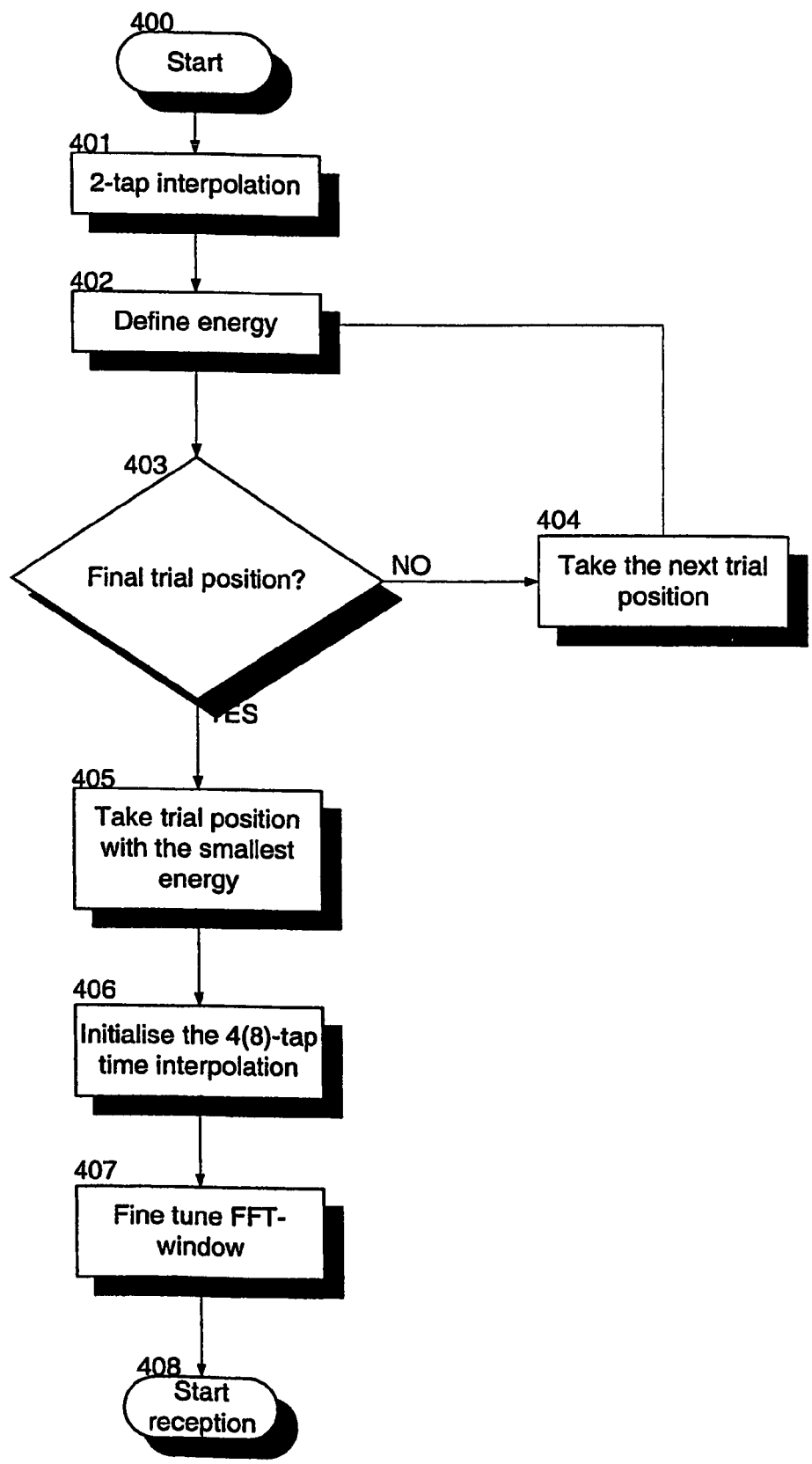
FIG. 4 depicts in a form of a flow chart a method for a receiving a signal in accordance with embodiments of the invention.

Some methods of the embodiments has the following or similar principle as, for example, the embodied FIG. 4. The method may start with 2-tap interpolation method for the initially received signal (steps 400 and 401). Energy outside the estimated guard interval is defined (step 402). There is being checked if the currently applied trial position is (/is not) the final trial position (step 403). If it is not, next trial position is taken (step 404), and the process may go to the step 402. The trial position with the smallest energy outside the estimated guard interval is selected (step 405). The 4(8)-tap time interpolation with the selected trial position is initialized (406). The FFT-window is possibly fine tuned (step 407), and the signal reception such as data reception can be started in the step 408.

Figure 5:
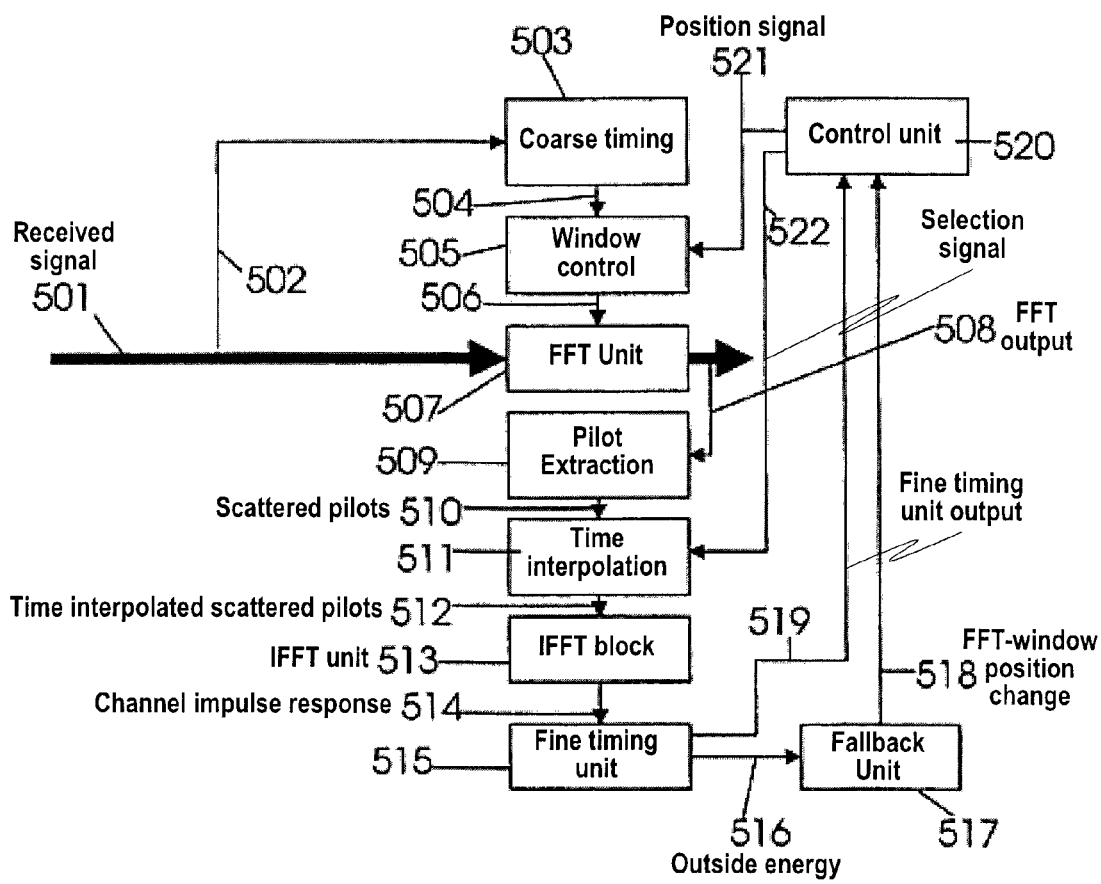
FIG. 5 depicts a functional block diagram for a reception procedure in accordance with embodiments of the invention.

FIG. 5 depicts a functional block diagram for a reception procedure in accordance with various embodiments of the invention. In FIG. 5 some operations and functionalities of the various embodiments of the invention are shown. The received signal (501) is fed into a Fast Fourier Transform (FFT) unit (507) or the like. The FFT unit (507) selects the position where the FFT is taken for the signal. The position where the FFT is taken can be based on a window control (505, 506) or the like, which is formed by the coarse timing (503, 504) or the like. Preferably, the coarse timing (503, 504) forms the position for the first time from the information of received signal (502). In some later steps of the process, the position where the FFT is taken can be based on a control by a control unit (520) or the like. Thus for the first time the signal is processed in various embodiments, the position can come from (or be set by) the window control (507). For the second and any possible subsequent time(s), the position comes from the control unit (521) or is set by the control unit (520).

Referring to the FIG. 5, the scattered pilots are extracted (block 509) from the FFT output (508). The scattered pilots (510) are time interpolated according to a selection signal (522) or the like. The time interpolation (511) can in the beginning be, for example, the linear interpolation. In various embodiments, when the process continues to run, sometimes with the loop perhaps, 4(8)-tap interpolation can be applied instead of the linear interpolation. The Inverse Fast Fourier Transform (IFFT) (IFFT block 513 or the like) is taken from the time interpolated scattered pilots (512). The output, which preferably is a Channel Impulse Response (CIR) (514) or the like is fed into a Fine Timing (FT) unit (515). In the FT unit (515) or the like, the energy estimation is performed. If the FFT-window position is not right, some Inter Symbol interference (ISI) is formed. In yet some embodiments, if the position is immediately "right" the rest of the predetermined trial positions can still be processed, perhaps according to the predefined scheme. Some embodiments of the FIG. 8 may depict this in more detail perhaps. The emergence of the interference will perhaps cause the rise of so-called "noise floor" or the like. The result is that the outside energy is now higher than it would be in the case where there is no or less ISI. This energy (516) is signalled into a fallback block (517) or the like. The fallback block (517) can advantageously keep track on used trial positions. The fallback block (517) signals (518) the FFT-window position change to the control unit (520). If the FFT-window position change is not the selected position, the control unit (520) changes the FFT-window position according to a predefined scheme or the like. The control unit (520) can also keep the same time interpolation. When all trial positions has been tried, the fallback unit (517) signals (518) the selected position into the control unit (520). This trial will be used in the FFT and the time interpolation (by the block 511) can be changed accordingly. The output of the fine timing block (519) can be used by the control unit (520) to further fine-tune the FFT window position. Preferably the correct trial position can be found out by taking the trial position, which has the smallest outside energy.

Figure 6:
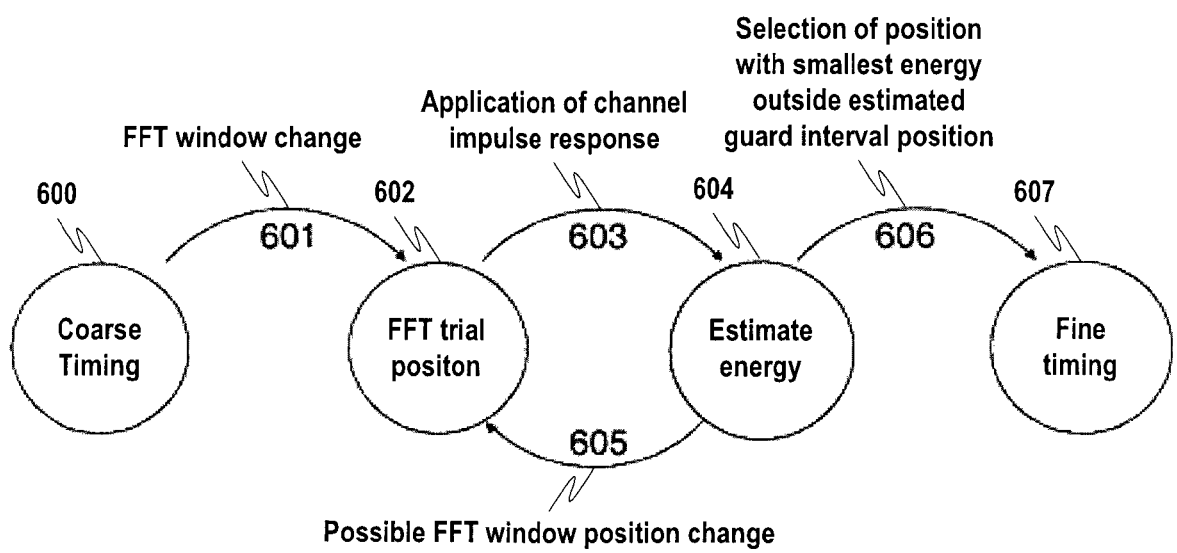
FIG. 6 depicts in a form of a state diagram a method for receiving a signal in accordance with embodiments of the invention.

FIG. 6 depicts in a form of a state diagram a method for receiving a signal in accordance with the embodiment of the invention. A state diagram of the various embodied processes can be depicted. The reception process can start, and the coarse timing (CT) or the like is performed in the step 600. The FFT window can be changed according to the CT in the step 601. The FFT trial position can be performed in step 602. The energy estimation is performed with predetermined amount of trial positions in steps 602, 603, 604, and 605. For example, four trial positions may be applied. In the step 602 perhaps FFT and possibly IFFT takes place for the signal. In the step 603 the Channel Impulse Response (CIR) or the like is generated and applied. The energy is estimated in the step 604. In the step 605 the possible FFT window position change takes place. For example, according to a predefined scheme, perhaps according to four trial positions. The position with the smallest energy outside the estimated guard interval position is selected in the step 606. The fine timing (FT) (including perhaps the longer time interpolation) and tracking is performed with the selected trial position in the step 607. In this final state the FFT-window position can be still changed, but now according to a fine timing estimation. It should be noted that in each reception same procedure is performed so predetermined amount of trial positions are typically used, e.g. four trial positions.

Figure 7:
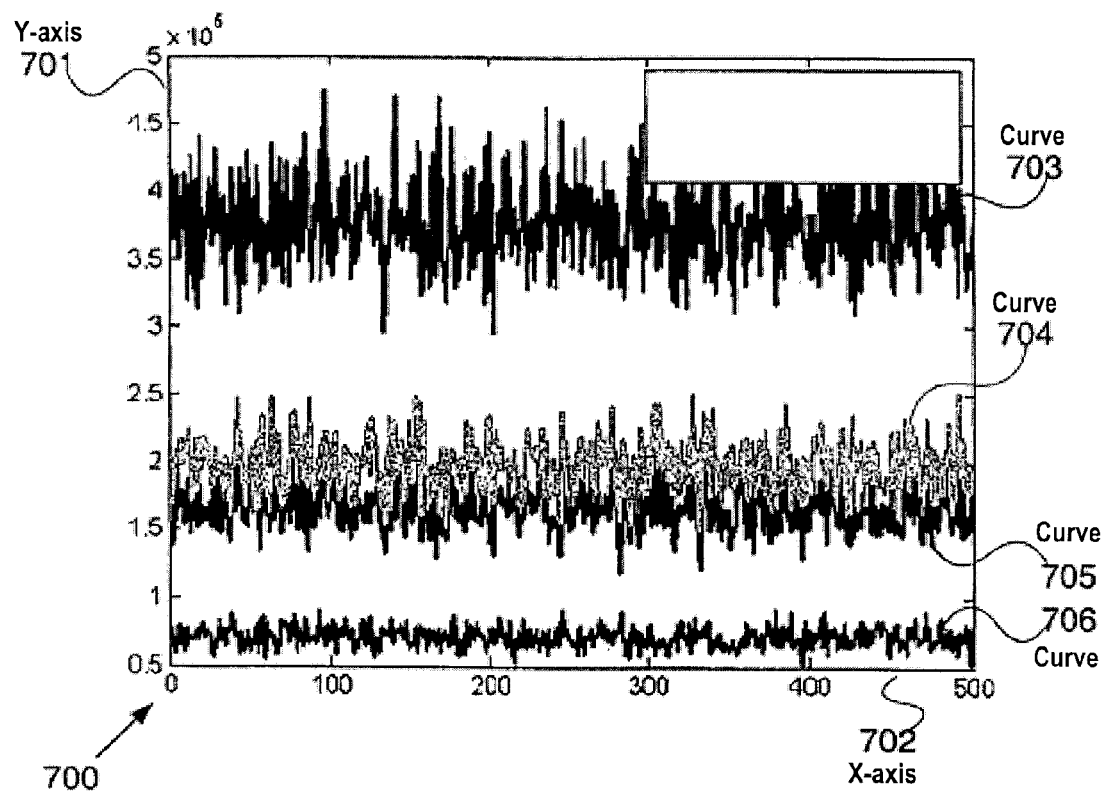
FIG. 7 shows simulation results on the outside energy with different trial positions for signals in accordance with embodied invention.

FIG. 7 shows simulation results on the outside energy with different trial positions for a signal reception in accordance with an embodied invention. In the FIG. 7, the simulation with 2 k-mode, guard interval of 512 samples, Doppler 200 Hz, SNR 10 dB, 3-tap SFN Rayleigh channels is applied. X-axis (702) denotes a number of the IFFTs. Y-axis (701) denotes the outside energy. A curve (703) in the diagram (700) has errors that equals to 226 samples. A curve (704) has errors that equals to 512 samples. A curve (705) has errors that equals to 369 samples, and a curve (706) has errors that equals to 83 samples. Thus, the smallest outside energy is in the case of the curve (706) with the smallest FFT-window error, which will advantageously identify the correct fall back loop to be used.

Figure 8:
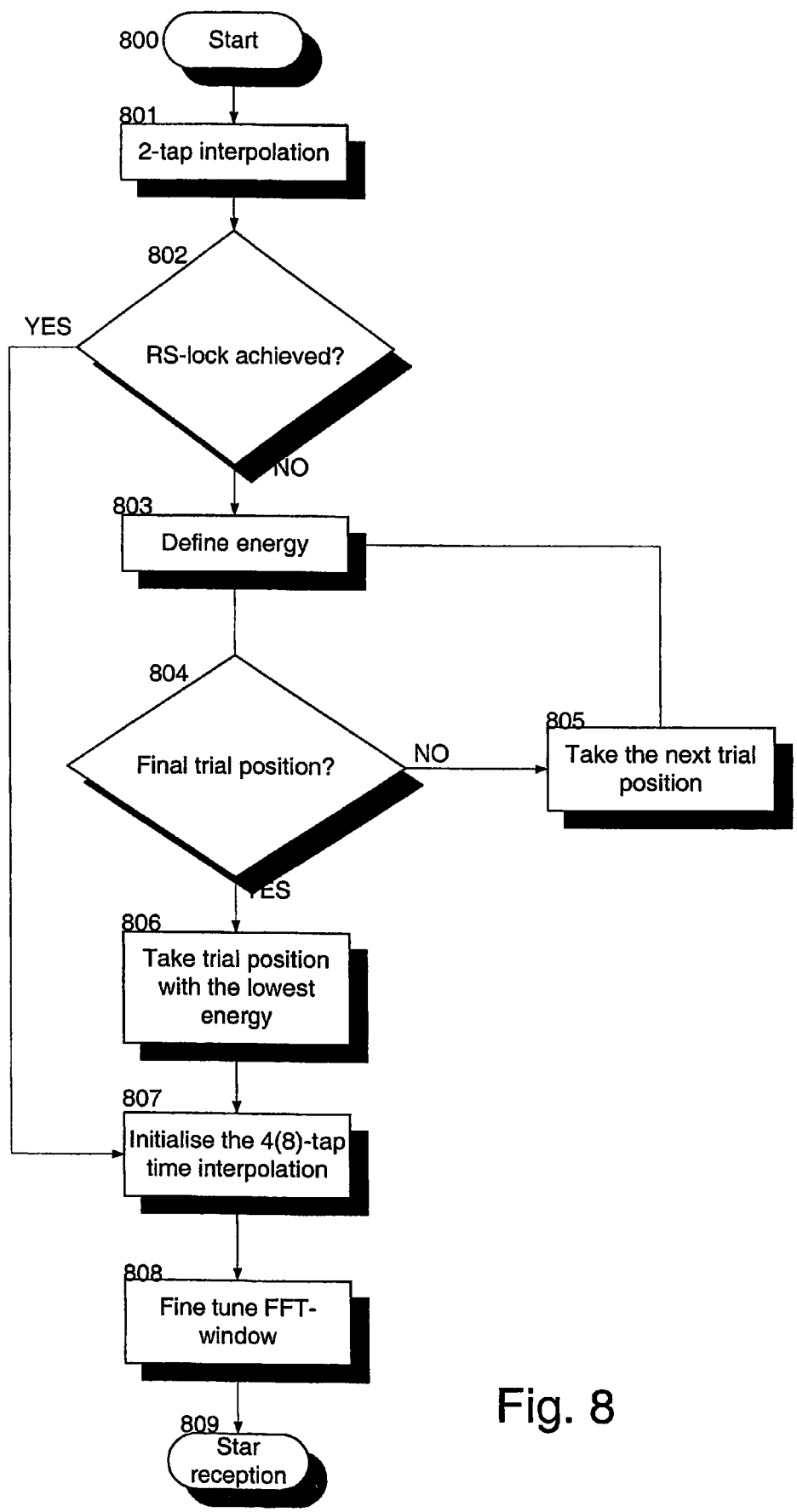
FIG. 8 depicts in a form of a flow chart a method for receiving a signal in accordance with embodiments of the invention.

Some embodiments of the invention can have also the following or the like process as, for example, depicted in the FIG. 8. The method may start with the 2-tap interpolation or the like (steps 800 and 801). There might be checked if RS lock is achieved in the step 802. In case it is, the process can preferably go to the step 807. The energy outside the estimated guard interval position is determined in the step 803. There can be checked whether the current trial position or the like is the final position in the step 804. If the current trial position is not the final position, the next trial position or the like is taken in the step 805, and the process may go to the step 803. A trial position with the lowest energy outside the estimated guard interval position is selected in the step 806. The 4(8)-tap time interpolation or the like is initialised in the step 807. The FFT-window is fine tuned in the step 808, and the reception may start in the step 809.

In the embodiments using the RS-lock, for example with the set-top box, the RS-lock can typically be achieved in the step 802 of the FIG. 8. The fallback procedure may perhaps not be used now. However, if the FFT-window is erroneous in the step 802 of the above exemplary method (for example, because of Doppler, "Ghost peaks", or Single Frequency Network (SFN) echoes), the energy estimation can advantageously still be performed. It might be that the first FFT-window is correct but because of, for example Doppler or "Ghost peaks", etc., the FFT-window will be adjusted wrongly, which will cause the ISI. In this case the energy detection should be able to detect this. When it is decided that the first window is correct, the full time interpolation is started. The RS-lock is achieved with the full time interpolation. Without this procedure, the reception may not perhaps be started because the system might be in believe of, for example "bad signal".

Preferably, the various embodiments of the invention provide reduction in the synchronization time in the reception. The needed time with this procedure may, for example, be (e.g. with the 8-tap time filtering)
8 k: 4×4+1×32 symbols (~53 ms) (4-tap ~35 ms)
4 k ~27 ms (4-tap ~18 ms)
2 k ~13 ms (4-tap ~9 ms).

Figure 9:
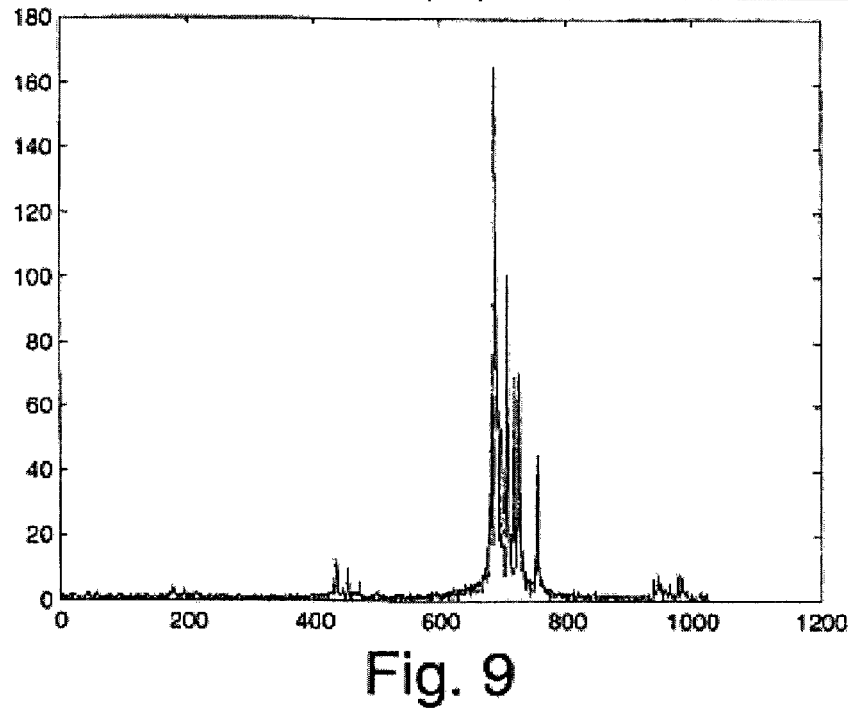
FIG. 9 illustrates a Channel Impulse Response (CIR) with no or few Inter Symbol Interference (ISI) present in embodiments of the invention.
Figure 10:
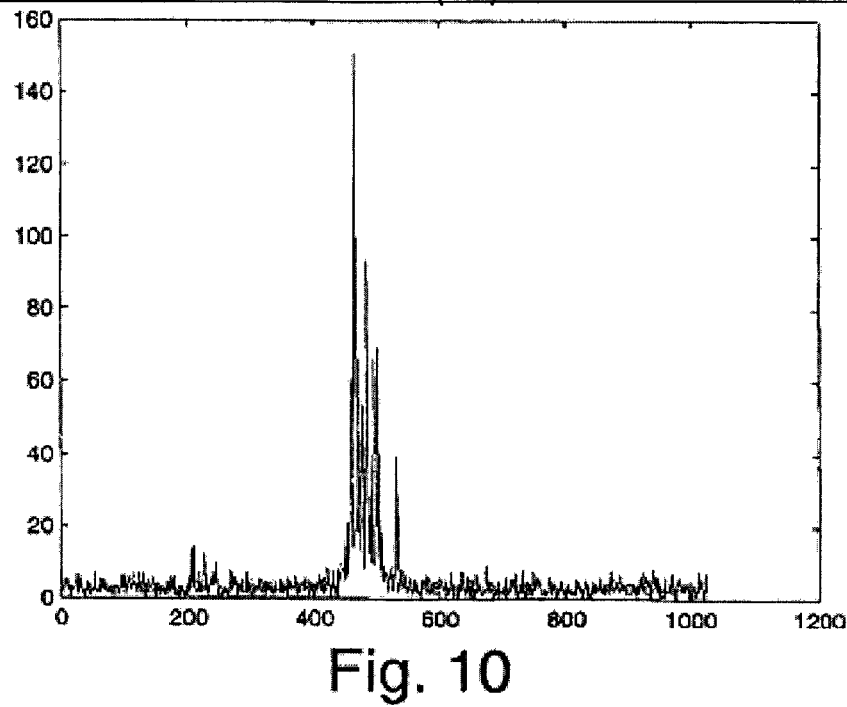
FIG. 10 illustrates a Channel Impulse Response (CIR) with some Inter Symbol Interference (ISI) present in embodiments of the invention.

The example of the FIG. 9 illustrates a Channel Impulse Response (CIR) with no or few Inter Symbol Interference (ISI) present in various embodiments of the invention. Similarly, the example of FIG. 10 illustrates a Channel Impulse Response (CIR) with some Inter Symbol Interference present in yet various embodiments of the invention. Reviewing the examples of FIGS. 9 and 10, the noise floor has risen in the example of FIG. 10 compared to the example of FIG. 9. This can advantageously show that the energy outside is higher in the example of FIG. 10 compared to the example of FIG. 9. Also the actual CIR has attenuated, which can show that inside/outside energy ratio is also smaller in FIG. 10.

Figure 11:
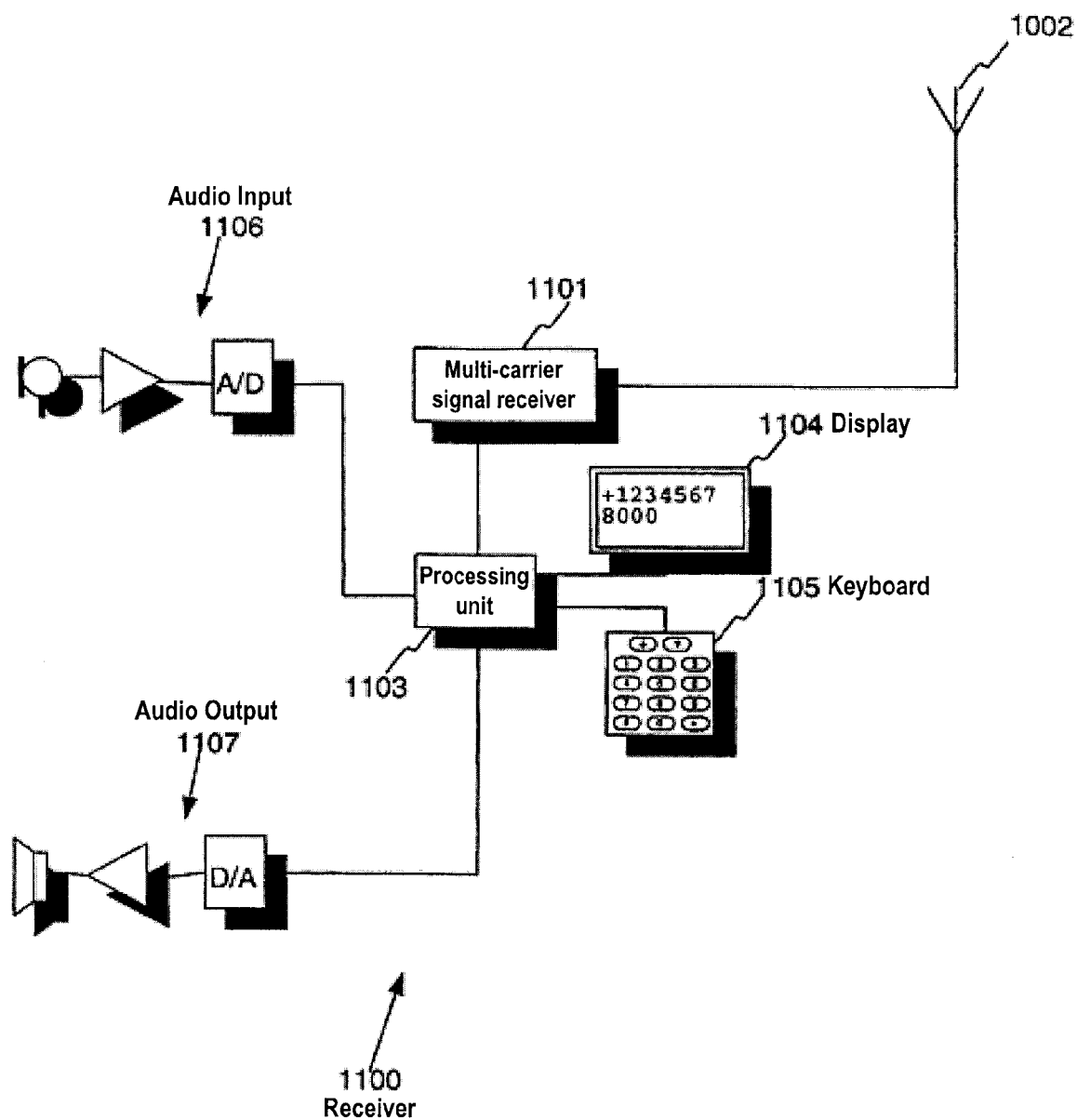
FIG. 11 depicts a functional block diagram of a receiver for receiving a signal in accordance with embodiments of the invention.

An example of FIG. 11 depicts a functional block diagram of a receiver. The receiver may be used in any/all of the various embodiments. The receiver comprises a processing unit (1103), a multi-carrier signal receiver part (1101) such as OFDM signal receiver and a user interface. The user interface comprises a display (1104) and a keyboard (1105). In addition, the UI comprises an audio input (1106), and audio output (1106). The processing unit (1103) comprises a microprocessor (not shown), possibly a memory (not shown) and perhaps software (not shown). The processing unit (1103) controls, on the basis of the software, the operations of the receiver, such as receiving a signal, receiving the data stream, time interpolating the signal, defining the energy inside and/or outside of the estimated guard interval, FFT window trial positioning, selection of the trial position, fine tuning of the FFT-window. Various operations are described in the examples of FIGS. 4-10.

Referring to the FIG. 11, alternatively, middleware or software implementation can be applied (not shown). The receiver can be a hand-held device which the user can comfortable carry. Advantageously, the receiver can be a mobile phone which comprises the multi-carrier signal receiver part (1101) such as the OFDM receiver for receiving OFDM signal. The receiver may perhaps interact with the service providers.

Figure 12:
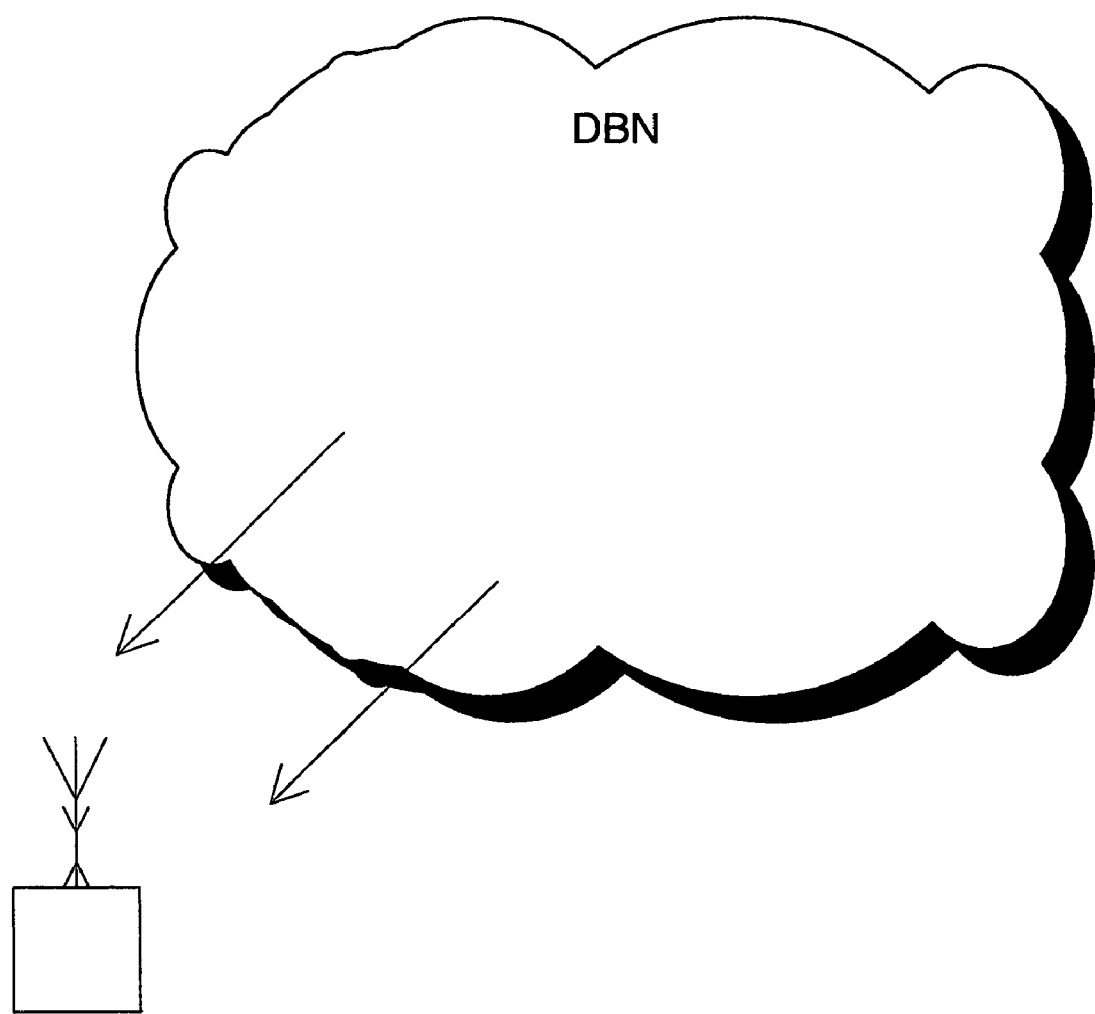
FIG. 12 depicts a general architecture of the system where some principles of the embodiments of the invention can be applied.

Various embodiments of the invention can be applied in the system of FIG. 12. The receiver operates preferably under coverage of a digital broadcast network (DBN) applying e.g. OFDM radio signal based transmission. The receiver is capable of receiving the transmission the DBN is providing and receives the OFDM based signal. The receiver can time interpolate the signal, defining the energy inside and/or outside of the estimated guard interval, perform the FFT window trial positioning, perform the selection of the trial position, the fine tuning of the FFT-window. Various operations are described in the examples of FIGS. 4-10.

In various embodiments information on the energy estimation can be applied. In yet some embodiments information on the energy estimation either inside the estimated guard interval or outside the estimated guard interval can be applied. Furthermore, advantageously based on the knowledge that the interference causes the rise of the energy, the appropriate position for the FFT window can be found.

There are further many alternative methods to select correct trial position. In the following some exemplary basic ways are described.

In various embodiments, the Automatic Frequency Control (AFC), Sampling Clock Syncronization (SCS) and Transmission Parameter Signalling (TPS) lock could be the prerequisite for trial position selection. For example, the position is selected (or some embodiments energy is estimated) only if the AFC and/or the SCS and/or the is TPS are in lock.

The trial positions can, in some further embodiments, be based on the FFT-window, which is selected by the first fine timing operation.

In yet some further embodiments, the energy estimation can be based on the energy ratio between the energy inside estimated guard interval and the energy outside estimated guard interval.

In yet some further embodiments, the energy estimation can be based on the maximum energy inside the estimated guard interval.

While there has been described what are believed to be the preferred embodiments of the present invention, those skilled in the art will recognise that other and further changes and modifications may be made thereto without departing from the spirit of the invention, and it is intended to claim all such changes and modifications as fall within the true scope of the invention.

The invention claimed is:

1. A method comprising:
   defining, at a defining unit, an energy of pilot carriers in a multi-carrier signal in respect of an estimated guard interval position of said signal, and
   based on said energy, selecting a position for a time domain to frequency domain transform window of said signal, wherein the selecting is based on an energy ratio between energy sample inside the estimated guard interval position and energy sample outside the estimated guard interval position.

2. A method according to claim 1, wherein the defining further comprises:
   defining the energy of said pilot carriers in said signal in respect of the estimated guard interval position of said signal for predetermined amount of trial positions for said time domain to frequency domain transform window,
   and the selecting further comprises:
   selecting said position from said trial positions.

3. A method according to claim 1, wherein the selection comprises: selecting said position for the time domain to the frequency domain transform window of said signal in such a way that the smallest amount of inter symbol interference is formed.

4. A method according to claim 1, wherein said selecting is based on energy outside the estimated guard interval position having the minimum.

5. A method according to claim 1, wherein said selecting is based on energy inside the estimated guard interval position having the maximum.

6. A method according to claim 1, further comprising:
   performing a coarse timing for said signal for an initial position for said time domain to frequency domain transformation window.

7. A method according to claim 1, wherein the defining is performed according to a predetermined scheme for determining a predetermined amount of trial positions for said time domain to frequency domain transform window, and
   based on said energy, selecting the time domain to frequency domain transformation window from said trial positions in such a way that the smallest amount of inter symbol interference is formed.

8. A method according to claim 1, further comprising:
   performing a fine timing with the selected time domain to frequency domain transformation window for fine tuning said selected time domain to frequency domain transformation window.

9. A method according to claim 1, further comprising:
   performing a first time interpolation for said signal,
   further, before selecting,
   taking a certain amount of trial positions for said time domain to frequency domain transformation window in accordance with a predefined scheme,
   and further,
   based on said energy, selecting the time domain to frequency domain transformation window position of said trial positions with the smallest amount of interference,
   initializing a second time interpolation with the selected position, and
   fine tuning said time domain to frequency domain transformation window.

10. A method according to claim 9, wherein said first time interpolation comprises a linear time interpolation.

11. A method according to claim 1, wherein said time domain to frequency domain transform window of said signal comprises FFT-window.

12. A method according to claim 1, wherein said multi-carrier signal comprises a mobile IP over DVB-T signal.

13. A method according to claim 1, wherein said pilot carriers are scattered pilot carriers.

14. An apparatus comprising a processor configured to perform the method according to claim 1.

15. A computer readable medium comprising program code adapted to carry out the method of claim 1 when run on a computer.

16. A receiver, comprising:
   a defining unit configured to define an energy of pilot carriers in a multi-carrier signal in respect of an estimated guard interval position of said signal, and
   a selection unit configured to select a position for a time domain to frequency domain transform window of said signal based on said defined energy, wherein the selection unit is further configured to select on a basis of an energy ratio between energy sample inside the estimated guard interval position and energy sample outside the estimated guard interval position.

17. A receiver according to claim 16 wherein said defining unit comprises a fine timing unit.

18. A receiver according to claim 16, wherein said selection unit comprises a fallback unit for tracking predetermined trial positions for time domain to frequency domain transform window and a control unit for selecting the position from said trail positions.

19. A method for receiving an OFDM radio signal, comprising the steps of:
   (a) receiving said signal,
   (b) selecting, at a selection unit, an initial position for a FFT-window of said signal in accordance with a coarse timing,
   (c) performing FFT to said initial position to obtain a first output,
   (d) extracting scattered pilots from said first output to obtain a second output,
   (e) performing a linear time interpolation for said second output,
   (f) performing IFFT for the time interpolated scattered pilots for obtaining a channel impulse response (CIR),
   (g) estimating energy based on the CIR,
   (h) keeping track on used trial positions with said energy,
   (i) changing FFT-window position in accordance with a predefined scheme until predefined amount of trial positions for said FFT-window have been applied,
   (j) selecting a FFT-window from said trial positions,
   (k) performing a time interpolation for the scattered pilots based on the selected FFT-window,
   (l) performing IFFT for the time interpolated scattered pilots, and
   (m) fine tuning the selected FFT-window in accordance with the IFFT.

20. A method, comprising:
defining, at a defining unit, an energy of pilot carriers in a multi-carrier signal in respect of an estimated guard interval position of said signal, and
based on said energy, selecting a position for a time domain to frequency domain transform window of said signal, wherein said selecting is based on energy outside the estimated guard interval position having the minimum.

21. A method, comprising:
defining, at a defining unit, an energy of pilot carriers in a multi-carrier signal in respect of an estimated guard interval position of said signal,
based on said energy, selecting a position for a time domain to frequency domain transform window of said signal wherein said selecting is based on energy inside the estimated guard interval position having the maximum.

22. A receiver, comprising:
a defining unit configured to define an energy of pilot carriers in a multi-carrier signal in respect of an estimated guard interval position of said signal, and
a selection unit configured to select a position for a time domain to frequency domain transform window of said signal based on said defined energy, wherein said selection unit is configured to perform the selecting on a basis of energy outside the estimated guard interval position having the minimum.

23. A receiver, comprising:
a defining unit configured to define an energy of pilot carriers in a multi-carrier signal in respect of an estimated guard interval position of said signal, and
a selection unit configured to select a position for a time domain to frequency domain transform window of said signal based on said defined energy, wherein said selection unit is configured to perform the selecting on a basis of energy inside the estimated guard interval position having the maximum.

24. A computer readable medium comprising program code adapted to carry out the method of claim 20 when run on a computer.

25. A computer readable medium comprising program code adapted to carry out the method of claim 21 when run on a computer.

* * * * *